Figure 1:
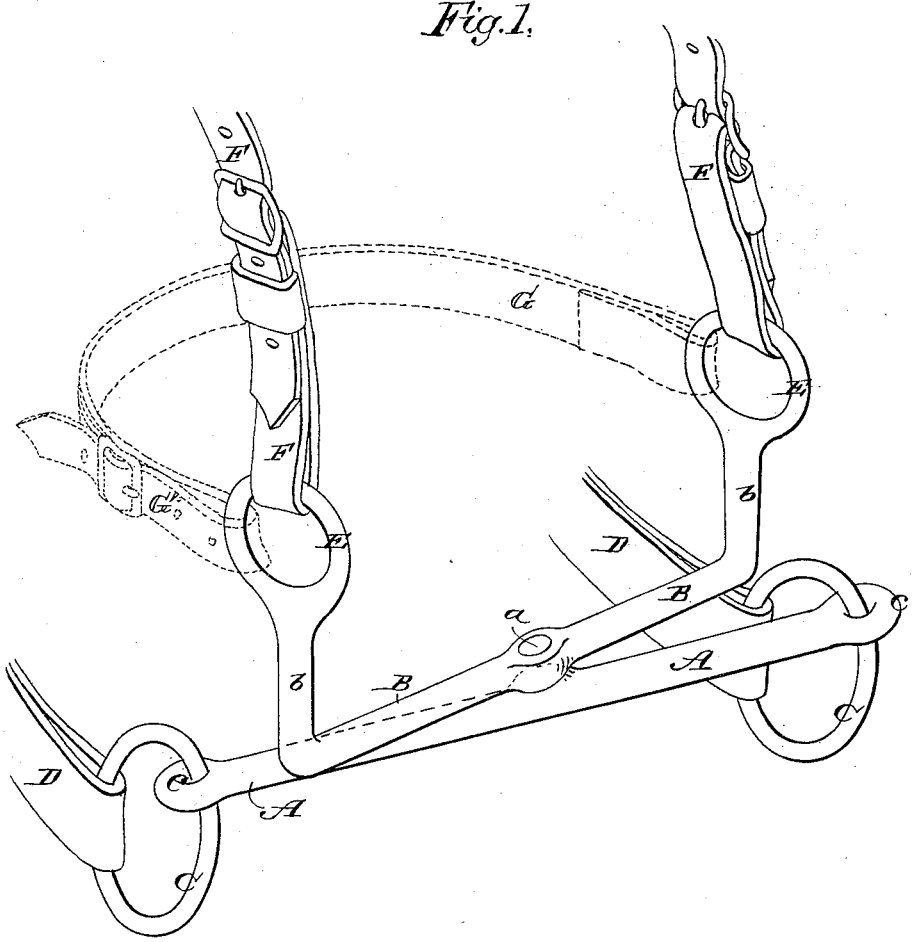

(No Model.)

E. Q. DARR.
BRIDLE BIT.

No. 329,629.   Patented Nov. 3, 1885.

WITNESSES:
H. W. Beyer
C. Sedgwick

INVENTOR:
E. Q. Darr
BY Munn & Co.
ATTORNEYS.

UNITED STATES PATENT OFFICE.

EMRY Q. DARR, OF SHELBYVILLE, INDIANA.

BRIDLE-BIT.

SPECIFICATION forming part of Letters Patent No. 329,629, dated November 3, 1885.

Application filed July 7, 1885. Serial No. 170,892. (No model.)

*To all whom it may concern:*

Be it known that I, EMRY QUIGLEY DARR, of Shelbyville, in the county of Shelby and State of Indiana, have invented a new and Improved Bridle-Bit, of which the following is a full, clear, and exact description.

This invention consists, first, in a bridle-bit for horses, composed of two rigid bars of different lengths placed one above the other and pivoted together centrally, the upper bar to be suspended by the usual cheek-straps and rings in the ends of the rigid projections thereon to remain in a fixed position across the horse's mouth, and the swiveled lower bar to turn on its pivot to guide the horse by lines in the usual manner; second, in a bridle-bit constructed and operating substantially as herein described, consisting of two rigid bars of different lengths pivoted together centrally, the upper and shorter bar having rigid projections extending upwardly to prevent lateral movement of the bit across the horse's mouth, in combination with a lower longer bar of sufficient length not to touch the corners of the mouth with the end rings or with the ends of the bar in guiding the horse.

Reference is to be had to the accompanying drawing, forming part of this specification, in which the figure represents a view in perspective of my improved bridle-bit, showing the two rigid bars of different lengths pivoted together centrally, one above the other.

A in the accompanying drawing represents the guiding-bar of the bit, pivoted centrally beneath the upper and shorter bar, B, which is attached to the cheek-straps F of the bridle, in the usual manner. The bar A is provided at each end with an eye, c, in which is fitted a loose ring, C, and to the rings C C the reins D D are connected in the usual or any approved way. The bar B has upturned ends b b, which have rings or loops E E formed at their extremities, and to which loops the cheek-straps F F of the bridle are attached. It is evident that when a bit so arranged and connected with the bridle is in an animal's mouth the bit-bar A will be swung on the pivot a, as the rein D at either side is pulled for guiding the animal, and at the same time the bit-bar B will keep its place with reference to the bridle, and will not draw the cheek-straps of the bridle out of place or back and forth over the animal's head, thereby not only making it more comfortable for the animal and preserving a better and neater appearance of the bridle and harness generally, but insuring the greatly-increased sensitiveness of action of the bit in the animal's mouth, so that the slightest overpull or unequal draft on either rein D D will instantly be felt by the animal, which, of course, is due to the pivotal connection at a of the bit-bars A B, and the absence of any direct connection of the bit-bar A and the bridle, so that the pull on the rein is not largely expended in drawing on the bridle, but is transmitted directly to the animal's mouth; hence with this bit it will be easier to manage the animal, and the pleasure and safety of driving will be promoted. If desired, a curb strap, G, may be connected to the loops E E and run around the under jaw of the animal in the usual way.

The bit may be made of any approved materials, and the upper bit-bar, B, may be made smooth, so as not to hurt the animal's mouth, and the main bit-bar A may be made smooth or rough, and the bits may be used with side rein or overcheck, as desired.

Having thus described my invention, what I claim as new, and desire to secure by Letters Patent, is—

1. A bridle-bit composed of two rigid bars, A B, of different lengths, one bar placed above the other, the two bars pivoted together centrally and suspended by cheek-straps F and rings E in the rigid side projections, b, extending upwardly, so that the upper bar, B, may remain in a fixed position across the horse's mouth, and the swiveled lower bar, A, to turn on its pivot to guide the horse, substantially as herein described.

2. A bridle-bit constructed and operating substantially as herein set forth, consisting of two rigid bars, A B, of different lengths, pivoted together centrally, one above the other, the upper and shorter bar, B, with rigid side projections, b, extending upwardly to prevent lateral movement across the horse's mouth, in combination with the lower and longer bar, A, of sufficient length not to touch the corners of the mouth with the enlarged ends of the bar or with the rings C in guiding the horse, as set forth.

EMRY Q. DARR.

Witnesses:
JAMES C. MORRISON,
JAMES L. CAPP.